United States Patent [19]
Ueda

[11] 4,190,213
[45] Feb. 26, 1980

[54] SAFETY BELT TAKE-UP DEVICE

[75] Inventor: Takeo Ueda, Fujisawa, Japan

[73] Assignee: NSK-Warner K. K., Tokyo, Japan

[21] Appl. No.: 941,364

[22] Filed: Sep. 11, 1978

[30] Foreign Application Priority Data

Nov. 2, 1977 [JP] Japan .................... 52-147631[U]

[51] Int. Cl.² .................... A62B 35/02; B65H 75/48
[52] U.S. Cl. .................... 242/107.4 A; 242/107.4 B
[58] Field of Search ............ 242/107.4 R–107.4 E; 297/388; 280/744–747

[56] References Cited
U.S. PATENT DOCUMENTS

| | | | |
|---|---|---|---|
| 3,450,368 | 6/1969 | Glauser et al. | 242/107.4 B |
| 3,482,799 | 12/1969 | Wrighton et al. | 242/107.4 B |
| 3,578,260 | 5/1971 | Kell | 242/107.4 A |
| 3,991,953 | 11/1976 | Takada | 242/107.4 A |
| 4,059,242 | 11/1977 | Tanaka | 242/107.4 A |
| 4,083,511 | 4/1978 | Ikesue | 242/107.4 A |

FOREIGN PATENT DOCUMENTS 2526176  1/1976  Fed. Rep. of Germany ... 242/107.4 A
2643051  5/1977  Fed. Rep. of Germany ... 242/107.4 A

*Primary Examiner*—John M. Jillions
*Attorney, Agent, or Firm*—Shapiro and Shapiro

[57] ABSTRACT

A safety belt take-up device provided with a double sensing type emergency-lock mechanism comprises webbing draw acceleration sensing means, vehicle acceleration sensing means, first transmission means and lock means. The webbing draw acceleration sensing means may shift from a first position to a second position when a webbing is drawn out at an acceleration greater than a predetermined value. The vehicle acceleration sensing means may shift from a first position to a second position when the vehicle acceleration has exceeded a predetermined value. The first transmission means is connectible to a take-up spindle along with the shift from the first position to the second position of the webbing draw acceleration sensing means and/or the vehicle acceleration sensing means and adapted to shift from a first position to a second position due to the webbing draw-out force. The lock means may prevent the draw-out of the webbing when the first transmission means has shifted to its second position.

8 Claims, 9 Drawing Figures

SAFETY BELT TAKE-UP DEVICE

BACKGROUND OF THE INVENTION

1. Field of the Invention

This invention relates to a take-up device for emergency lock type safety belt suitable for use in vehicles, especially, automobiles.

2. Description of the Prior Art

Such a safety belt take-up device is disclosed, for example, in U.S. Pat. No. 3,450,368 and U.S. Pat. No. 3,482,799 which show the so-called webbing sensing type device in which an inertia member is provided on a webbing take-up spindle so that when the webbing draw acceleration has exceeded a predetermined value, an emergency lock mechanism is actuated by the take-up spindle and the offset of the rotation of the inertia member due to inertia to thereby prevent the drawing of the webbing.

Another type known is the so-called vehicle acceleration sensing type in which variations in the speed of the vehicle body may be sensed by a pendulum or the like to actuate an emergency lock mechanism (See, for example, U.S. Pat. No. 3,578,260).

SUMMARY OF THE INVENTION

It is an object of the present invention to provide a safety belt take-up device which may more positively lock under emergency.

It is also an object of the present invention to provide a safety belt take-up device which may positively operate without the lock member being kicked off by the locked member on the take-up spindle side.

According to the present invention, there is provided a safety belt take-up device provided with a double sensing type emergency-lock mechanism which comprises webbing draw acceleration sensing means adapted to shift from a first position to a second position when a webbing is drawn out at an acceleration greater than a predetermined value, vehicle acceleration sensing means adapted to shift from a first position to a second position when the vehicle acceleration has exceeded a predetermined value, first transmission means connectible to a take-up spindle along with the shift from said first position to said second position of said webbing draw acceleration sensing means and/or said vehicle acceleration sensing means and adapted to shift from a first position to a second position due to the webbing draw-out force, and lock means for preventing the draw-out of the webbing when said first transmission means has shifted to its second position.

The invention will become more fully apparent from the following detailed description thereof taken in conjunction with the accompanying drawings.

DESCRIPTION OF THE PREFERRED EMBODIMENTS

Figure 1:
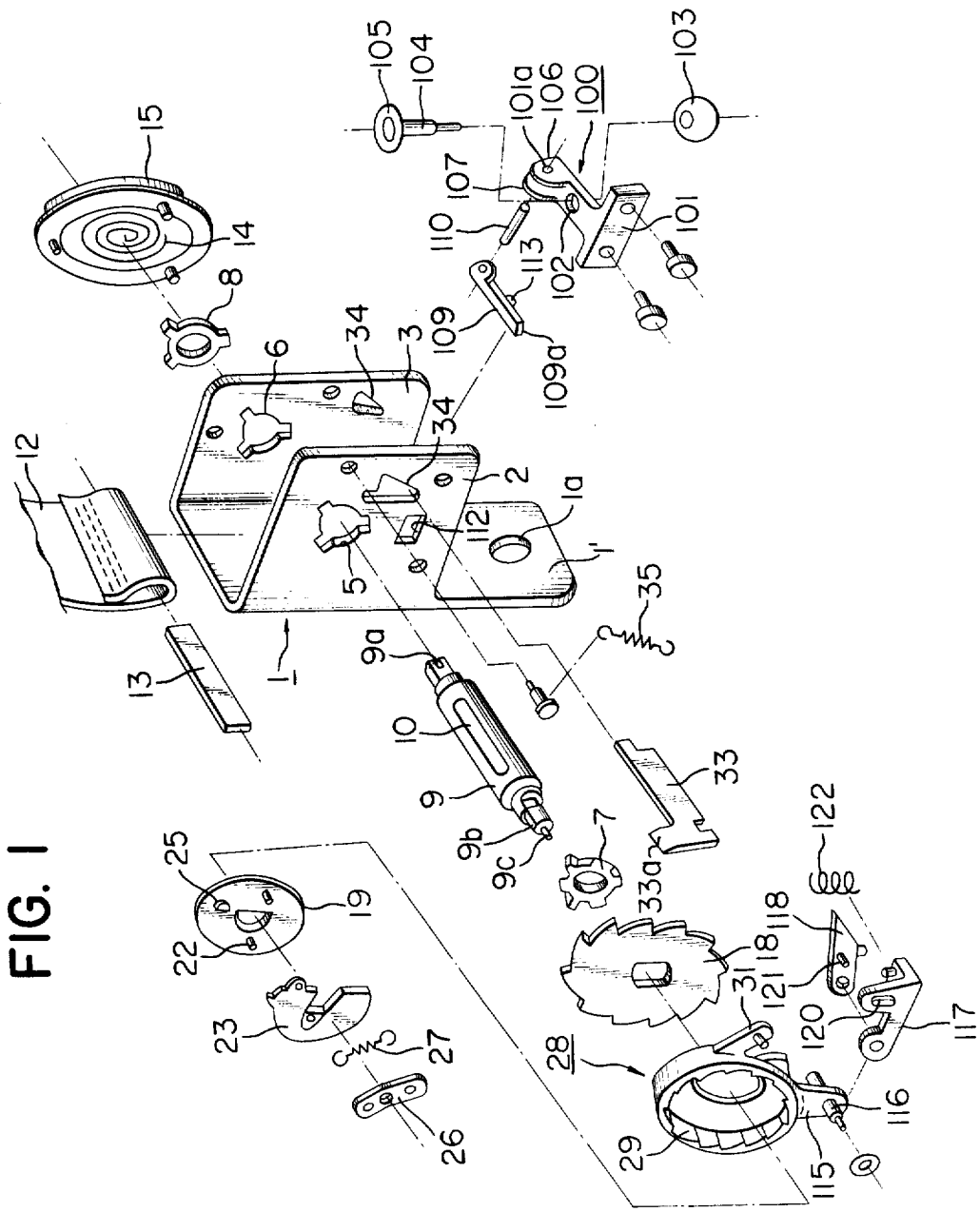
FIG. 1 is a schematic, exploded, perspective view of an embodiment of the present invention.

Referring to the drawings, reference character 1 designates the frame of the reel portion of a safety belt take-up device. The frame 1 is of a substantially U-shaped longitudinal section and has a base 1'.

The base 1' is provided with an aperture 1a for attaching therethrough the safety belt take-up device to a suitable part of the seat, the body or the door of a vehicle such as automobile by means of a suitable set member (not shown). The frame 1 has riser portions or side plates 2 and 3 formed with opposed apertures 5 and 6 through which a take-up spindle 9 is rotatably supported by means of bushes 7 and 8.

Figure 8:
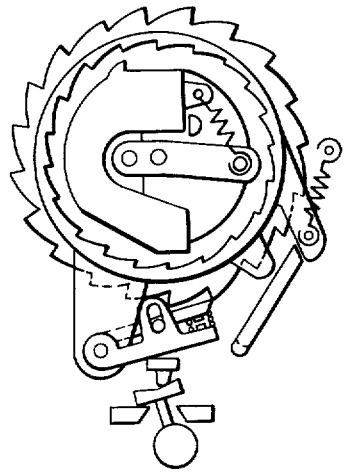
Figure 9:
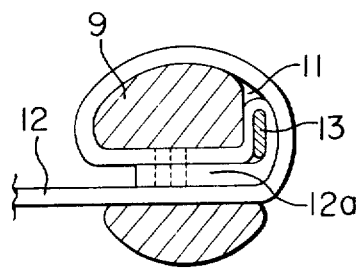
FIG. 9 is an enlarged cross-sectional view of the take-up spindle portion of the same embodiment.

The take-up spindle 9 has an axially extending elongated slot 10 formed in a portion thereof eccentric with respect to the axis of the spindle. As enlargedly shown in FIG. 9, the take-up spindle 9 has a cut-away flat portion 11 substantially perpendicular to the slot 10. A webbing 12 has its end turned back to provide a sack in which a core plate 13 is inserted. The end portion of the webbing 12 is passed through the slot 10 and secured to the take-up spindle so that the end sack portion of the webbing is fastened in such a manner that the portion of the take-up spindle having the cut-away flat portion 11 is wrapped by the sack portion. The webbing may of course be secured to the take-up spindle 9 in any other suitable manner, but the manner shown in FIG. 8 is advantageous in that it greatly facilitates the attachment work. The webbing 12 is normally wound on the take-up spindle 9 by the bias force of a spiral spring 14. The spiral spring 14 is secured at its outer end to a spring cover 15 fixed to the side plate 3, and at its inner end to a slot 9a at one end of the take-up spindle 9. The other end portion of the webbing 12 is attached to a tang coupled to a buckle (not shown) or any other suitable component forming part of the safety belt.

The other end of the take-up spindle extends outwardly of the side plate 2 so as to permit a ratchet gear 18 to be mounted integrally with the take-up spindle 9. The function of the ratchet gear will later be described.

The other end of the take-up spindle 9 also extends outwardly of the ratchet gear 18 and that portion of the spindle is formed with a cut-away step 9b. A disc 19 having a central opening complementary to the cut-away step 9b is fitted on that portion of the spindle, and is rotatable with the take-up spindle 9. The disc 19 is formed with an eccentrically located boss 22 on which a substantially semi-circular inertia member 23 is rotatably mounted with the centroid of the inertia member aligned with the boss. The disc 19 is provided with a stop 25 adjacent to the inertia member 23.

The take-up spindle 9 has its central portion smaller in radius than the portion having the cut-away step 9b and a holder plate 26 is secured to the reduced radiused central end portion 9c.

A coil spring 27 is disposed between one end of the holder plate 26 and the inertia member 23 to thereby normally bias the inertia member into engagement with the stop 25. Thus, when the angular rotational acceleration of the take-up spindle is within a predetermined value, namely, when the draw acceleration of the webbing is within a predetermined value, the inertia member 23 is caused to engage the stop 25 by the coil spring 27 so that the inertia member is rotated with the take-up vehicle 9 thereabout; when the draw acceleration of the webbing exceeds the predetermined value, the inertia member rotates with respect to the take-up spindle 9 against the bias of the coil spring 27 due to inertia.

Figure 2:
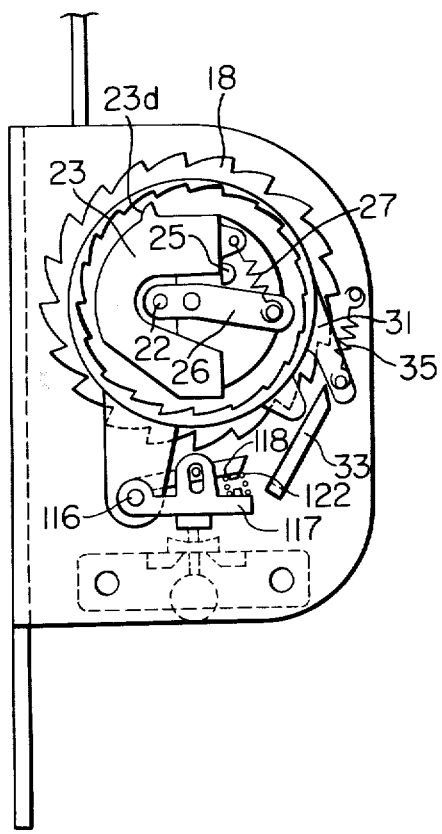
FIG. 2 is a side view of the same embodiment.
Figure 3:
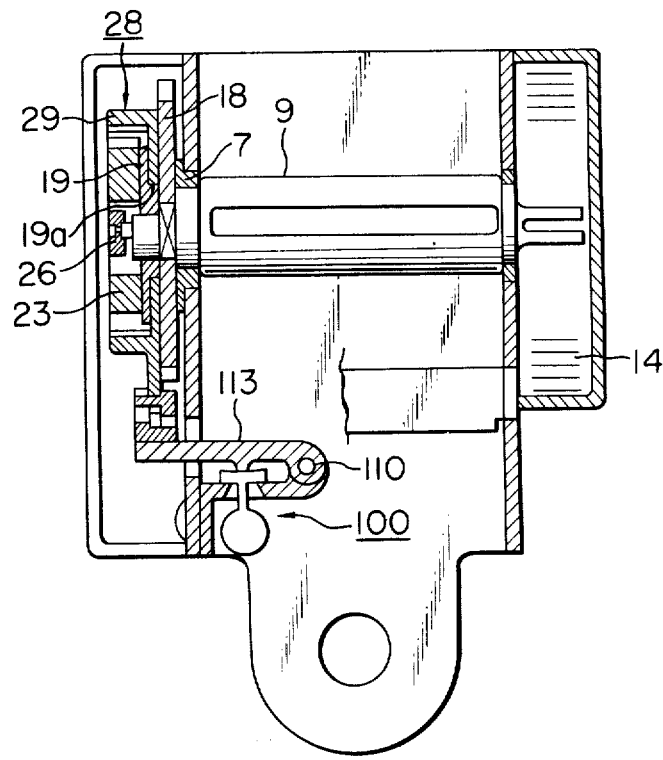
FIG. 3 is an axial sectional view of the same embodiment.

A circular cup member 28 is loosely mounted on the hub portion 19a of the disc 19 and has an axially outwardly directed cylinder portion 29 in the radial circumferential portion. The inner side of the cylinder portion 29 is formed with ratchet teeth which are mesh-engageable with the teeth 23d of the inertia member 23. The cup member 28 has an integral projection 31 on the circumference thereof. The projection 31 is engageable with a lock member 33. The lock member 33 rests on sector opening portions 34 formed in opposed relation in the side plates 2 and 3 so that as the cup member 28 is rotated clockwise, the lock member 33 is pushed down by the projection 31 of the cup member until the pawl 33a of the lock member is brought to a position to engage the ratchet gear 18, but the lock member 33 is normally in non-engaging position with the ratchet gear 18 due to a spring (not shown) provided between the base plate and the lock member (FIG. 2). The cup member 28 is also biased counterclockwise by the action of a spring 35 provided between the end of the projection 31 and the base side plate, and normally the lock member 33 is in non-locked position under the action of an unshown spring only.

On the other hand, a support member 101 for a vehicle acceleration sensing device 100 is inwardly projected and secured to the inner lower portion of the base side plate 2. The support member 101 has a hole 102 formed centrally of the length thereof and a pendulum 103 set so as to be tilted upon sensing of a predetermined acceleration is suspended by a rod 104. The rod 104 has an enlarged portion 105 above the hole 102 and the upper surface of the enlarged portion is formed into a dish form concave toward the center. The end portion 101a of the support member 101 is formed with upwardly extending projections 106 and 107 opposed to each other, and a sensing lever 109 is pivotally supported by a pin 110 between the projections. The sensing lever 109 extends through a rectangular hole 112, formed in the side plate 2, and outwardly of the side plate 2. A downwardly extending projection 113 is formed on the underside of the sensing lever 109, and rests on the dish-like concave portion 105 of the pendulum rod 104 to normally maintain the sensing lever 109 substantially horizontal. Therefore, if the predetermined acceleration is sensed to move the pendulum and incline the rod 104, the sensing lever 109 turns clockwise about the shaft 110 to raise the left end thereof.

The aforementioned cup member 28 is formed with a downwardly extending projection 115 having an axial pin 116 provided thereon, and a rockable lever 117 and a pawl lever 118 are pivotally supported on the axial pin 116. The rockable lever 117 and the pawl lever 118 are substantially equal in length, and a projection 121 formed on the pawl lever 118 is opposedly received in a slot 120 formed vertically in the rockable ever 117, while a compression coil spring 122 is interposed between the rockable lever 117 and the pawl lever 118 to widen the angle between the two levers 117 and 118 up to a maximum angle range allowed for by the pin-slot connection. The so constructed rockable lever 117 of the lock means rests on the end 109a of the aforementioned sensing lever 109 and is normally held horizontally as shown in FIG. 2. The pawled end portion of the pawl lever 118 is then in non-engaged position with respect to the ratchet gear 18.

Figure 4:
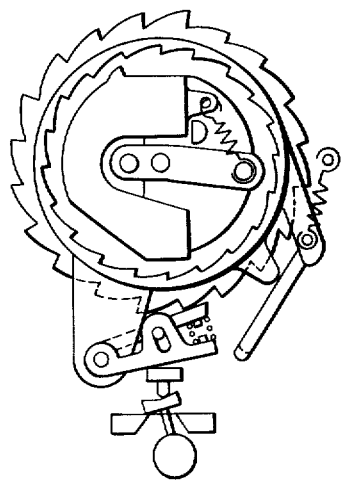
FIGS. 4 to 8 are schematic side views illustrating the operation of the same embodiment.
Figure 5:
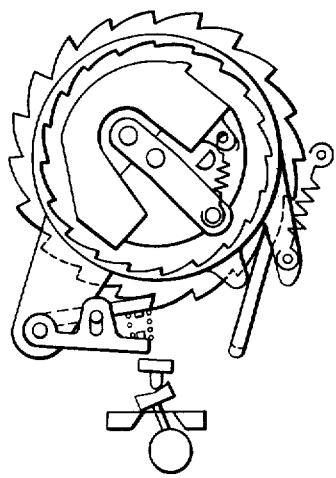
Figure 7:
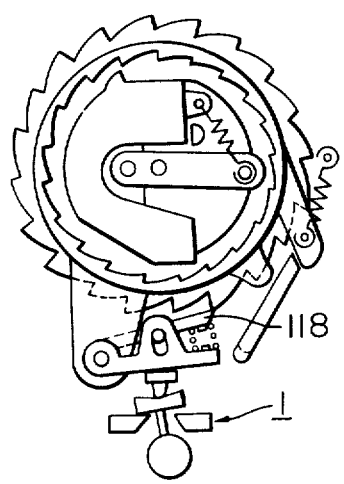

When the pendulum 103 swings upon sensing of a predetermined acceleration, the left end 109a of the sensing lever 109 is moved up in the manner already described, and accordingly the rockable lever 117 and the pawl lever 118 swing counterclockwise while maintaining the relation of FIG. 2 imparted by the spring 122, so that the tip end of the pawl lever 118 comes to its engaged position with respect to the ratchet gear 18 (FIGS. 4 and 5). Even if the tip end of the pawl lever 118 now strikes against a tooth end of the ratchet gear 18 and the pawl lever is kicked thereby (FIG. 7), the energy of the pawl lever 118 is absorbed by the compression coil spring 122 so that the pawl lever 118 can mesh-engage the next tooth of the ratchet gear without departing from its engaging position.

The rockable lever and the pawl lever may of course be replaced by a single lever.

A pendulum has been shown as the vehicle acceleration sensing means, but other inertia means such as ball, tiltable inertia member or the like may be employed.

When the vehicle body is in its normal running condition, the pendulum 103 for sensing the vehicle acceleration is in its predetermined position as shown in FIG. 2 and accordingly, the lock means comprising the rockable lever 117 and the pawl lever 118 is in non-engaged position with respect to the ratchet gear 18.

Also, in this condition of the vehicle, if the safety belt wearer draws the webbing in a usual manner, the webbing may readily be drawn out against the force of the take-up spring 14 or may be taken up on the take-up spindle by the biasing force of the take-up spring. When this occurs, the inertia member 23 is rotated with the take-up spindle.

If the speed of the vehicle is varied beyond a predetermined value by collison or the like, the vehicle acceleration sensing members 103, 104, 105 are tilted due to their inertia to thereby force up the projection 113, thus inclining the sensing lever 109 about its pivot 110. One end 109a of the lever 109 pivots the rockable lever 117 counterclockwise about the pin 116, as viewed in FIG. 2. At this time, the compression coil spring 122 is not deflected and accordingly, the pawl lever 118 is also rotated with the rockable lever 117 and comes into mesh-engagement with the ratchet gear 18 (FIG. 4).

Figure 6:
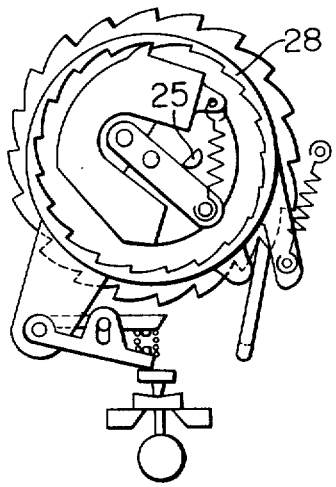

When the pawl lever 118 meshes with the ratchet gear 18 (FIG. 5), the ratchet gear 18 has been suddenly rotated clockwise by the webbing draw force imparted by the sudden speed change through the take-up spindle integral therewith, so that the pawl lever 118 takes the rotative force of the ratchet gear and accordingly, the cup member 28 supporting the pawl lever 118 is rotated clockwise about the take-up spindle, as shown in FIG. 6. The rotation of the cup member 28 causes the lock member in engagement with the projection 31 of the cup member to rotate counterclockwise and the pawl 33a thereof meshes with the ratchet gear 18 integral with the take-up spindle to thereby lock the take-up spindle against rotation.

When the pawl lever 118 having come into the meshing position with respect to the ratchet gear 18 strikes against the tooth top of the ratchet gear and is kicked thereby, as already noted, the impact force imparted to the pawl lever 118 by the ratchet gear is absorbed by the compression coil spring 122 and at the same time, the pawl lever 118 is caused to mesh with the ratchet gear 18 by the momentary return force of the spring 122, thus locking the take-up spindle in the same manner as already described.

On the other hand, when a speed change beyond a predetermined value has occurred, the safety belt wearer is moved relative to the vehicle, for example, leans forward due to the inertia force, so that the webbing is rapidly drawn out to suddenly rotate the take-up spindle. Therefore, the inertia member 23 is rotated counterclockwise about the boss 22 due to the inertia force against the force of the spring 27 and accordingly, the pawl 23d formed on the inertia member 23 meshes with the ratchet tooth inside the cylinder portion of the cup member 28. As a result, the cup member is rotated with the take-up spindle through the agency of the inertia member 23 so that the projection 31 thereof causes the lock member 33 to fall down into mesh-engagement with the ratchet gear 18, thus stopping the take-up spindle from rotating.

According to the present invention, both the mechanism for sensing the vehicle acceleration to emergency-lock the take-up spindle and the mechanism for sensing the webbing draw acceleration to emergency-lock the take-up spindle are provided and this ensures the emergency-lock action to take place more positively than before.

Also, according to the present invention, several of the parts forming these two mechanisms are used in common and thus, the entire device is simple in construction and low in manufacturing cost.

What I claim is:

1. A safety belt take-up device provided with a double sensing type emergency-lock mechanism comprising:
   webbing draw acceleration sensing means connected to a take-up spindle for the webbing and adapted to shift from a first position to a second position when webbing is drawn out at an acceleration greater than a predetermined value;
   vehicle acceleration sensing means adapted to shift from a first position to a second position in response to a predetermined vehicle acceleration;
   first transmission means connectible to said take-up spindle in accordance with the shift from said first position to said second position of said webbing draw acceleration sensing means and/or said vehicle acceleration sensing means and adapted to shift from a first position to a second position due to the webbing draw-out force;
   second transmission means provided on said first transmission means and adapted to shift from a first position to a second position with the shift of said vehicle acceleration sensing means to its second position, said second transmission means when in its second position being connectible to said take-up spindle to move said first transmission means from its first position to its second position, said second transmission means comprising two opposed levers pivotally supported on said first transmission means, a limiting member for limiting the angle formed by and between said two levers, and bias means for biasing said levers toward a maximum angle direction, one of said levers being mesh-engageable with a ratchet gear formed on said take-up spindle when said second transmission means is in its second position; and
   lock means for preventing the draw-out of the webbing when said first transmission means has shifted to its second position.

2. A safety belt take-up device according to claim 1, wherein said take-up spindle has an integral ratchet gear, and said lock means has a lock member capable of meshing with said ratchet gear to prevent rotation of said take-up spindle.

3. A safety belt take-up device according to claim 2, wherein
   said webbing acceleration sensing means has an inertia member which is normally rotated with the take-up spindle but which, when the webbing draw acceleration has exceeded said predetermined value, makes a relative motion with respect to said take-up spindle due to inertia;
   said first transmission means has a cup member which is connectible to said take-up spindle through said inertia member when said inertia member makes said relative motion; and
   said lock member meshes with said ratchet gear by said cup member to stop rotation of said take-up spindle when said cup member is connected to said take-up spindle to shift to its second position.

4. A safety belt take-up device according to claim 1, wherein said vehicle acceleration sensing member includes a pendulum.

5. A safety belt take-up device comprising:
   inertia means adapted to shift from a first position to a second position in response to a predetermined acceleration of the vehicle;
   gear means fixed to take-up spindle means of the take-up device;
   means for locking the take-up spindle means, the locking means being movable between a non-locking position in which the locking means does not engage the gear means and a locking position in which the locking means engages the gear means to prevent said gear means from rotating in the draw-out direction of the webbing wound around the take-up spindle means;
   pawl means being movable between a non-engaging position in which the pawl means does not engage the gear means, an intermediate position in which the pawl means is engageable with the gear means and an advanced position in which the pawl means has engaged the gear means, the pawl means being shifted from the non-locking position to the intermediate position in association with the movement of said inertia means from said first position to said second position and being shifted from the intermediate position to the advanced position in association with the draw-out of the webbing, said pawl means comprising two pivotally supported opposed levers, a limiting member for limiting the angle formed by and between said two levers and bias means for biasing said levers toward a maximum angle direction, one of said levers being engageable with said gear means when said pawl means is in its intermediate position; and
   movable means supporting said pawl means, the movable means being shifted from a first position to a second position in accordance with the movement of said pawl means for the intermediate position to the advanced position so that said movable means actuates said locking means into said locking position.

6. A safety belt take-up device according to claim 5, wherein said movable means is rotatably supported about said take-up spindle of the take-up spindle means.

7. A safety belt take-up device according to claim 6, wherein said gear means includes a single ratchet gear.

8. A safety belt take-up device according to claim 5, wherein said inertia means includes a pendulum.

* * * * *